United States Patent [19]

Kopczynski

[11] Patent Number: 4,817,747
[45] Date of Patent: Apr. 4, 1989

[54] ALL-TERRAIN VEHICLE

[76] Inventor: John F. Kopczynski, 1671 Sweeney St., N. Tonawanda, N.Y. 14120

[21] Appl. No.: 116,397

[22] Filed: Nov. 3, 1987

[51] Int. Cl.$^4$ ............................................. B62D 61/10
[52] U.S. Cl. ................................. 180/22; 180/24.04; 180/24.08
[58] Field of Search .................... 180/22, 24.08, 24.04, 180/76

[56] References Cited

U.S. PATENT DOCUMENTS

| 2,256,570 | 9/1941 | Kopczynski | 180/7.1 |
|---|---|---|---|
| 2,642,144 | 6/1953 | Brewer | 180/24.06 |
| 2,683,495 | 7/1954 | Kopczynski | 180/7.1 |
| 2,711,221 | 6/1955 | Kopczynski | 180/24.05 |
| 2,786,540 | 3/1957 | Sfredda | 180/24.08 |
| 2,790,503 | 4/1957 | Kopczynski | 180/70.1 |
| 2,819,767 | 1/1958 | Kopczynski | 180/7.1 |
| 3,204,713 | 9/1965 | Shanahan et al. | 114/270 |
| 3,315,977 | 4/1967 | Small | 280/677 |
| 3,351,037 | 11/1967 | Meili | 114/270 |
| 3,397,896 | 8/1968 | Willetts | 280/677 |
| 3,506,079 | 4/1970 | Madler et al. | 180/24.08 |
| 3,756,619 | 9/1973 | Thorsell | 280/104 |
| 3,809,004 | 5/1974 | Leonheart | 114/270 |

FOREIGN PATENT DOCUMENTS 359322 3/1938 Italy ..................... 180/24.08

Primary Examiner—Kenneth R. Rice
Attorney, Agent, or Firm—Joseph P. Gastel

[57] ABSTRACT

An all-terrain vehicle having six wheels with three wheels on each side. Two of the wheels on each side are mounted on one pivotal bogie, and one wheel is mounted on another pivotal bogie, and the bogies are coupled to each other to always assume the same inclination to the horizontal centerline of the vehicle chassis in all pivotal positions thereof. The wheels may be round, or they may be oblate for greater traction. Certain of the oblate wheels on each side of the vehicle are oriented with their axes at 90° to each other in all pivotal positions thereof, and the compensating action of the pivoting bogies will cause the vehicle body to remain perfectly level on level ground as the oblate wheels rotate. The outer wheels, whether round or oblate can be raised or lowered relative to the vehicle body, while the center wheel moves in an opposite direction. All wheels are positively driven by gearing which includes gearing in the bogies. When the vehicle has round wheels, a differential gearing arrangement is utilized to prevent scuffing among any of the wheels as the bogies pivot.

57 Claims, 8 Drawing Sheets

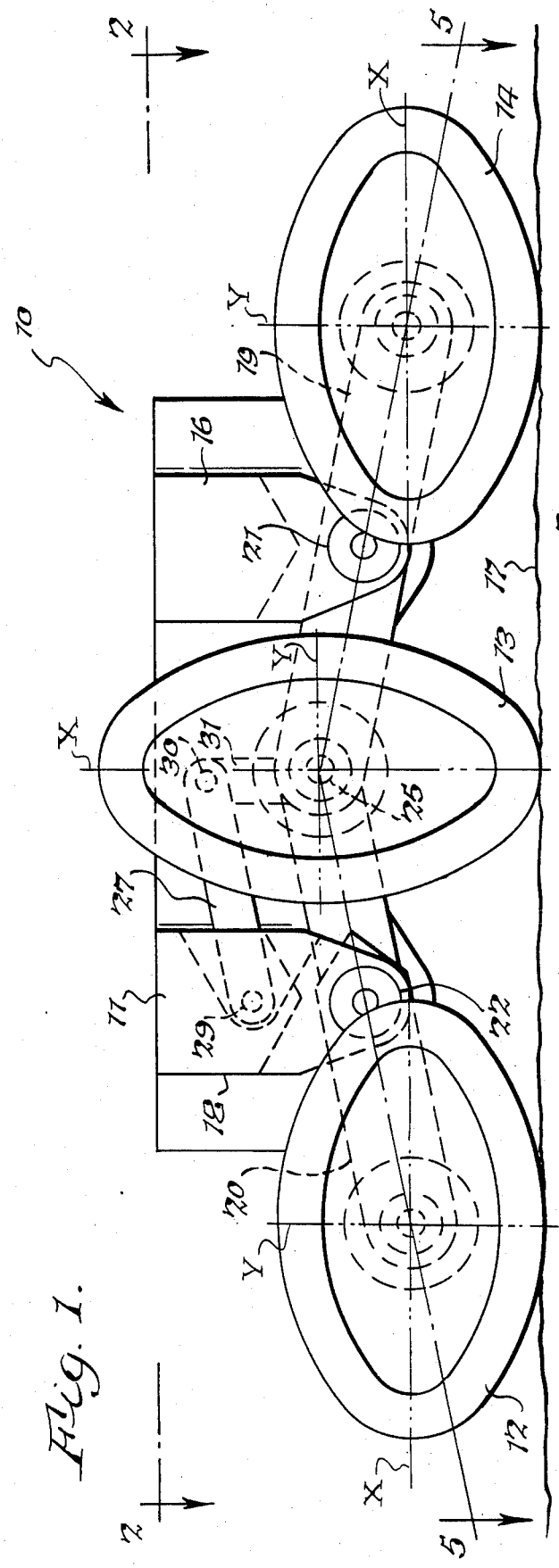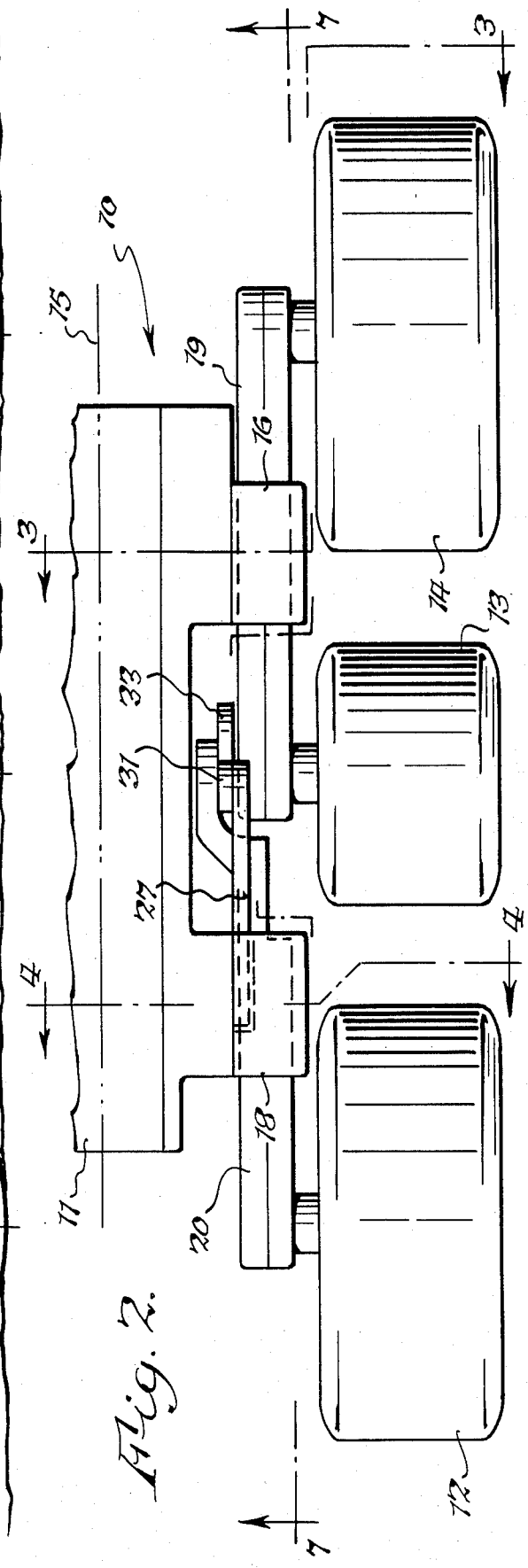

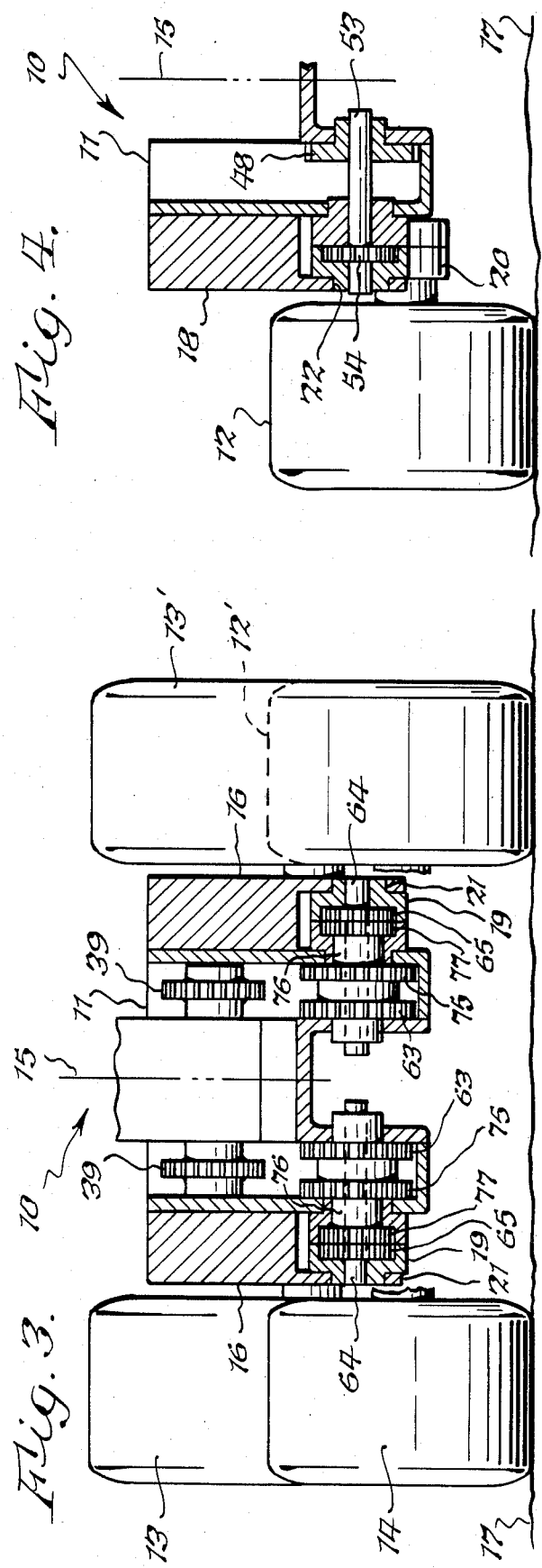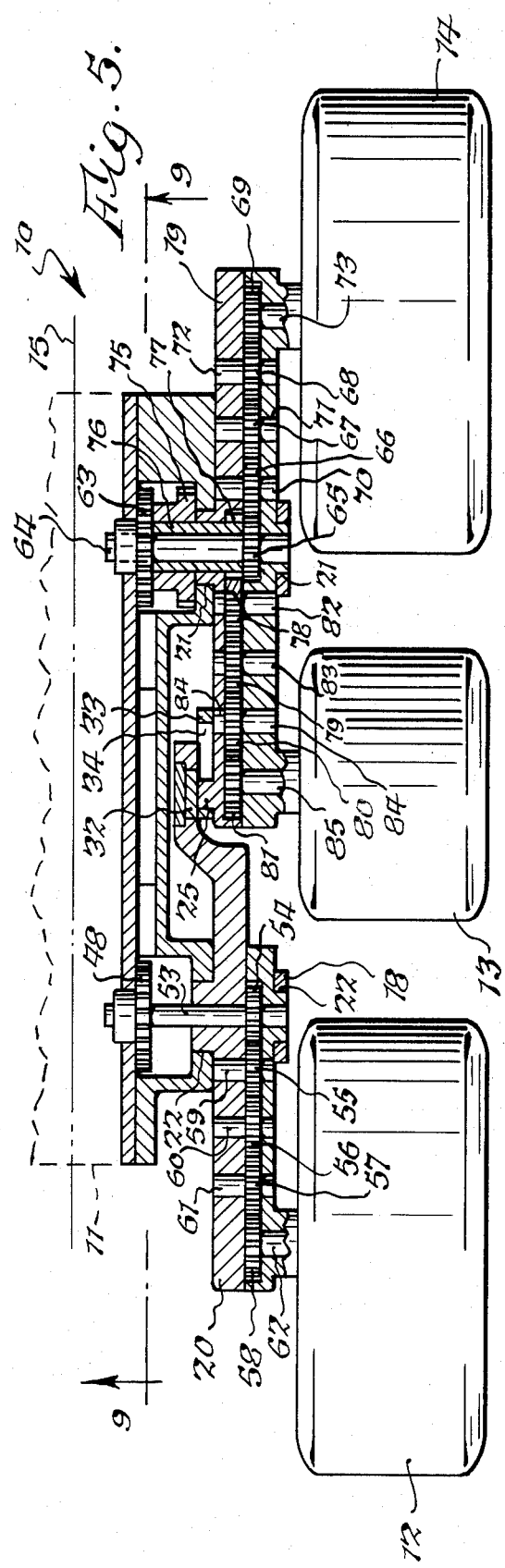

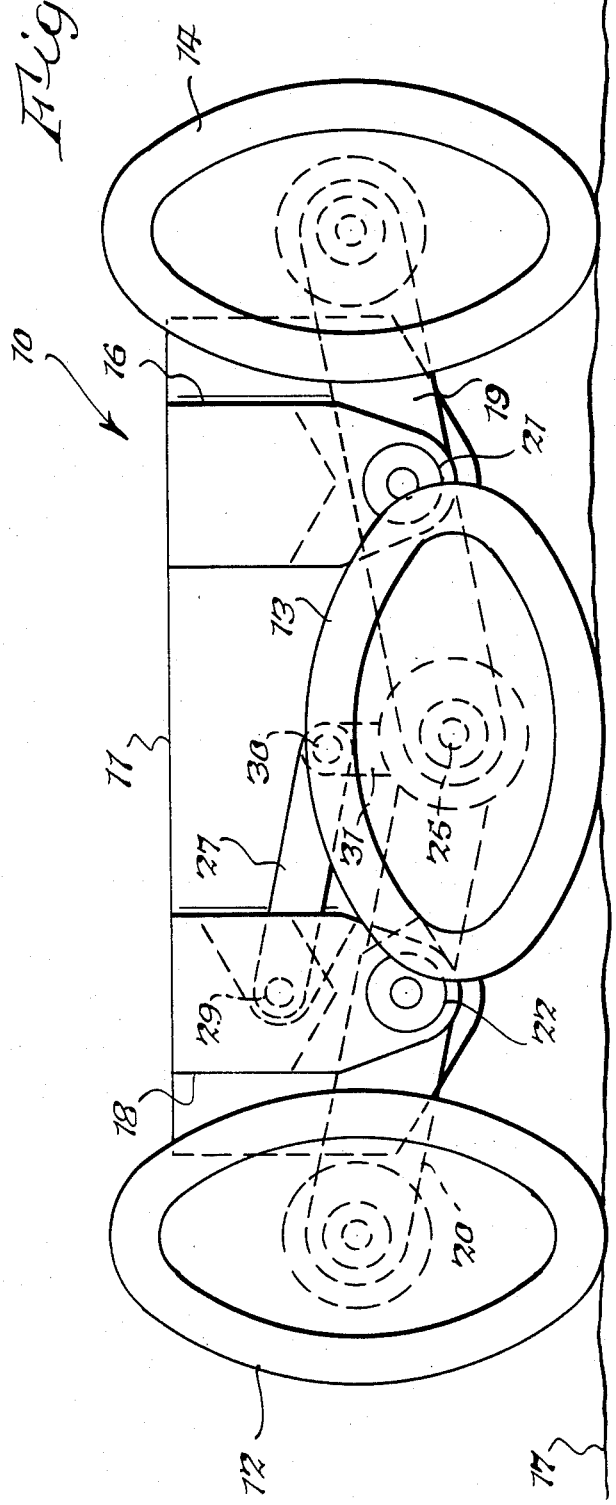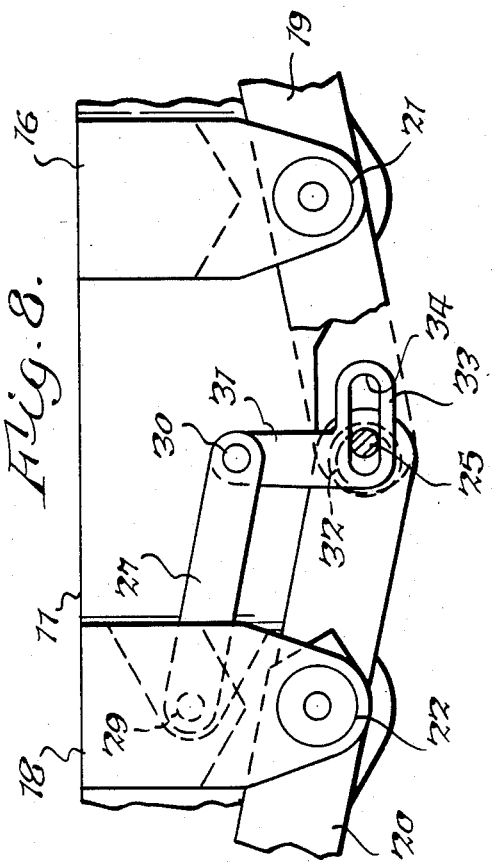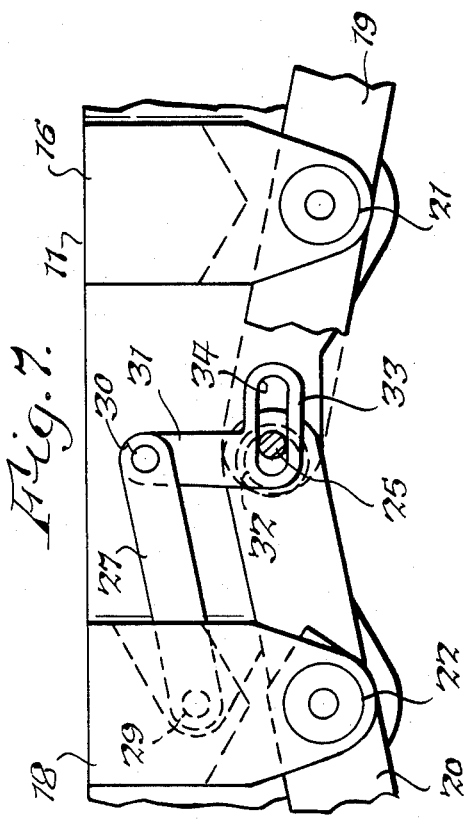

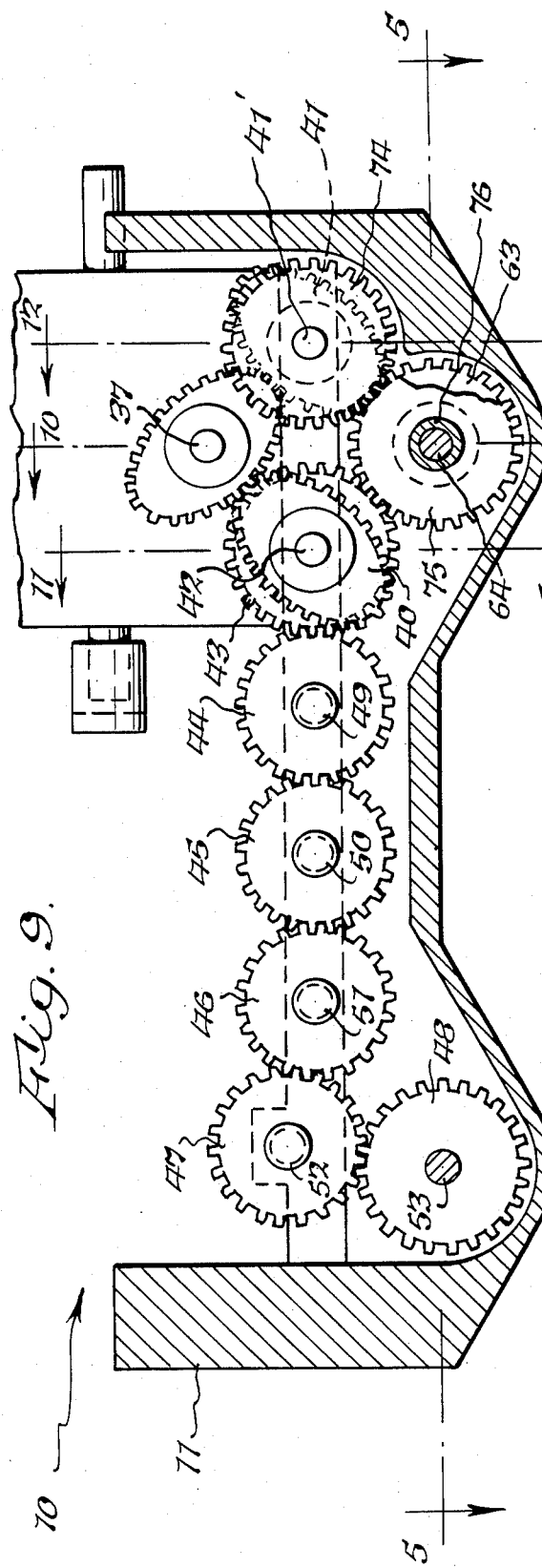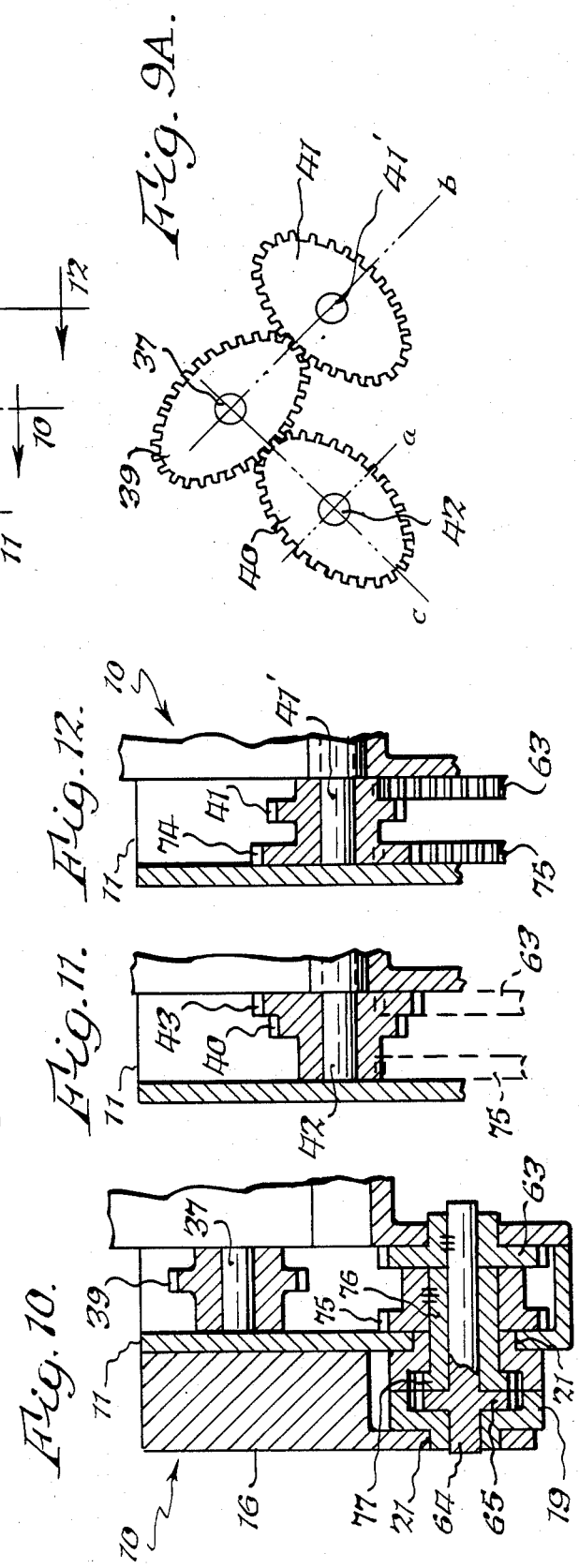

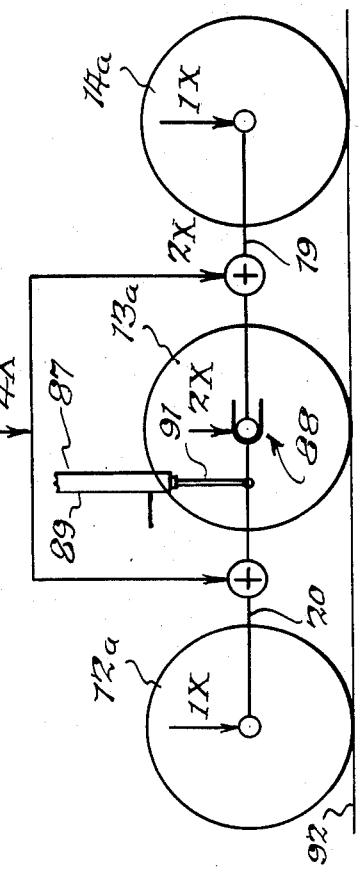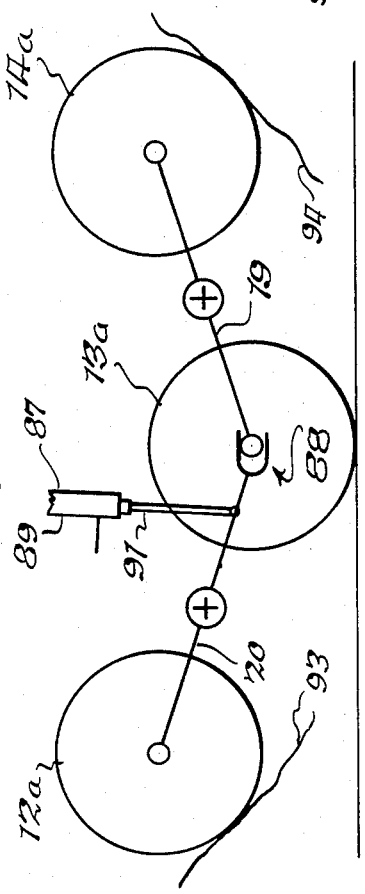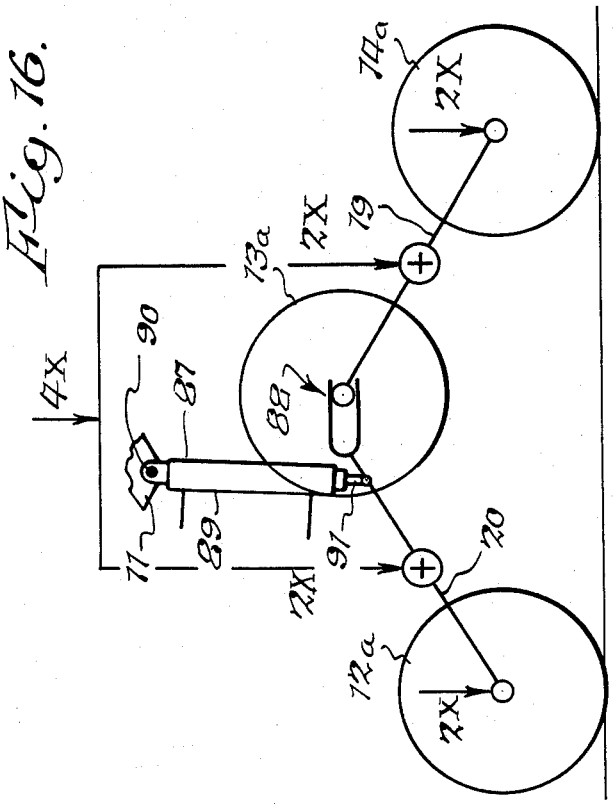

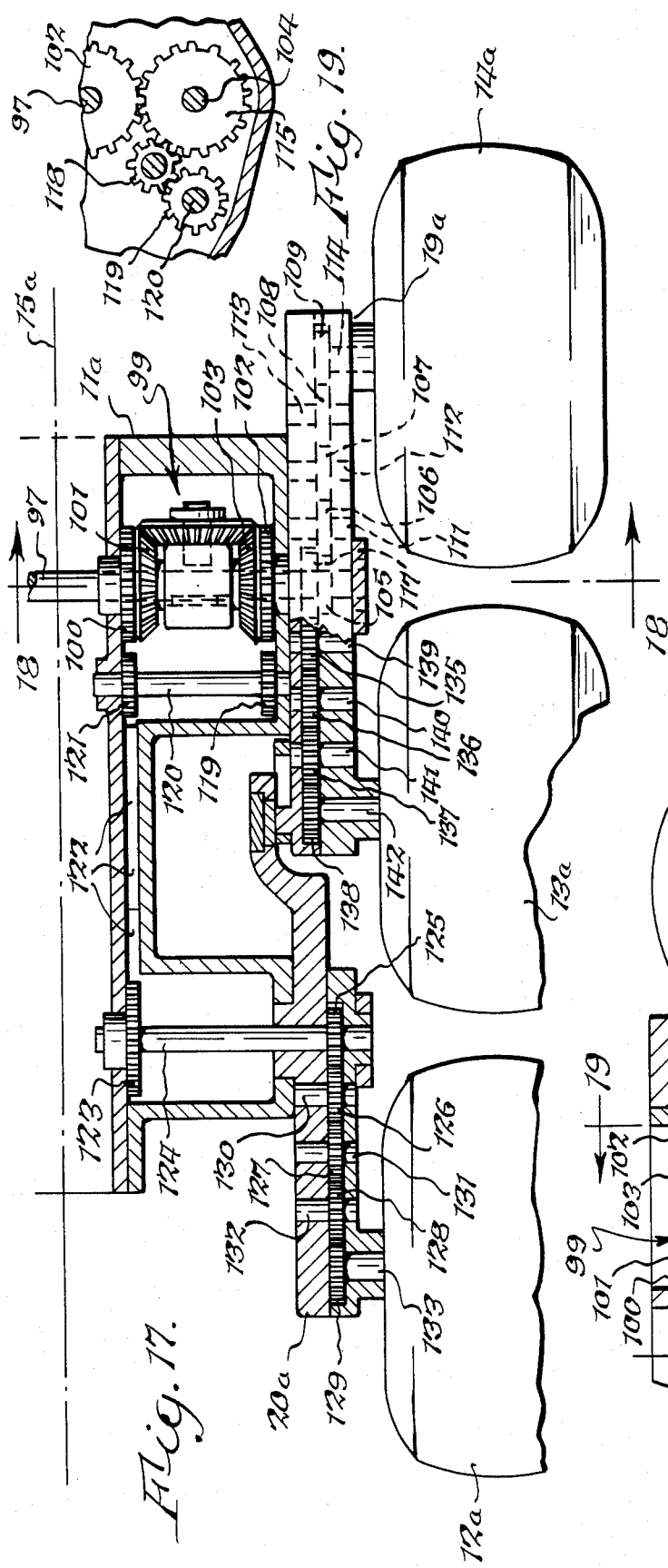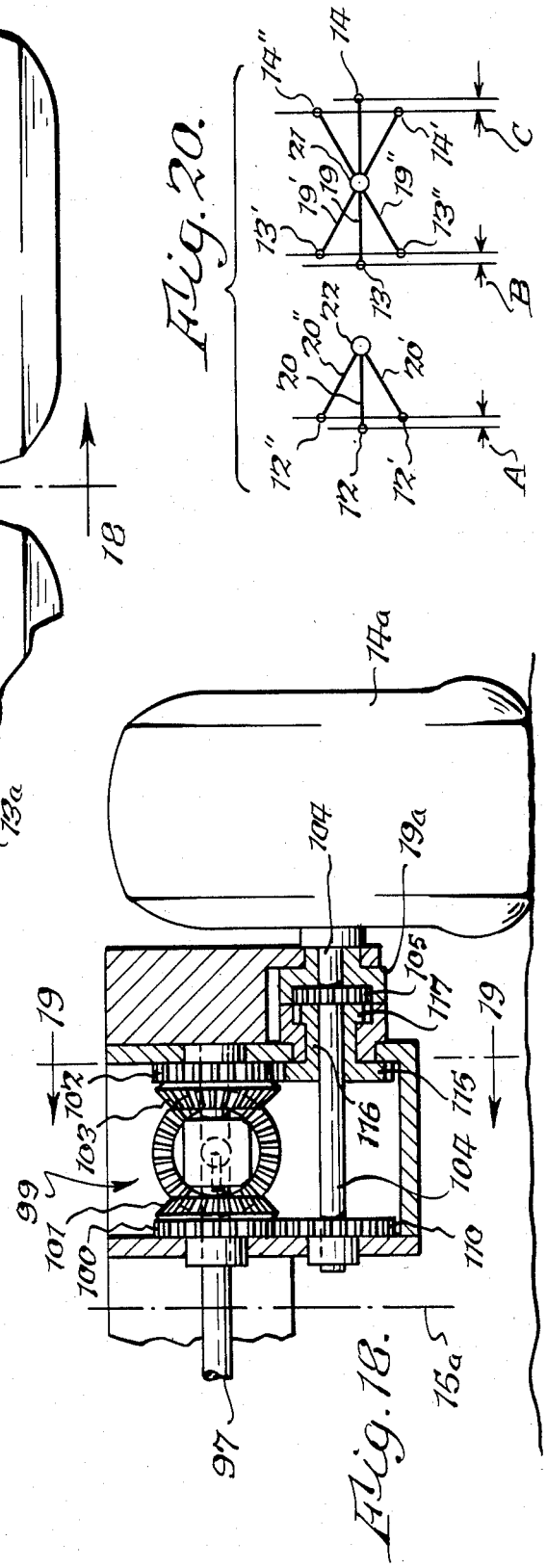

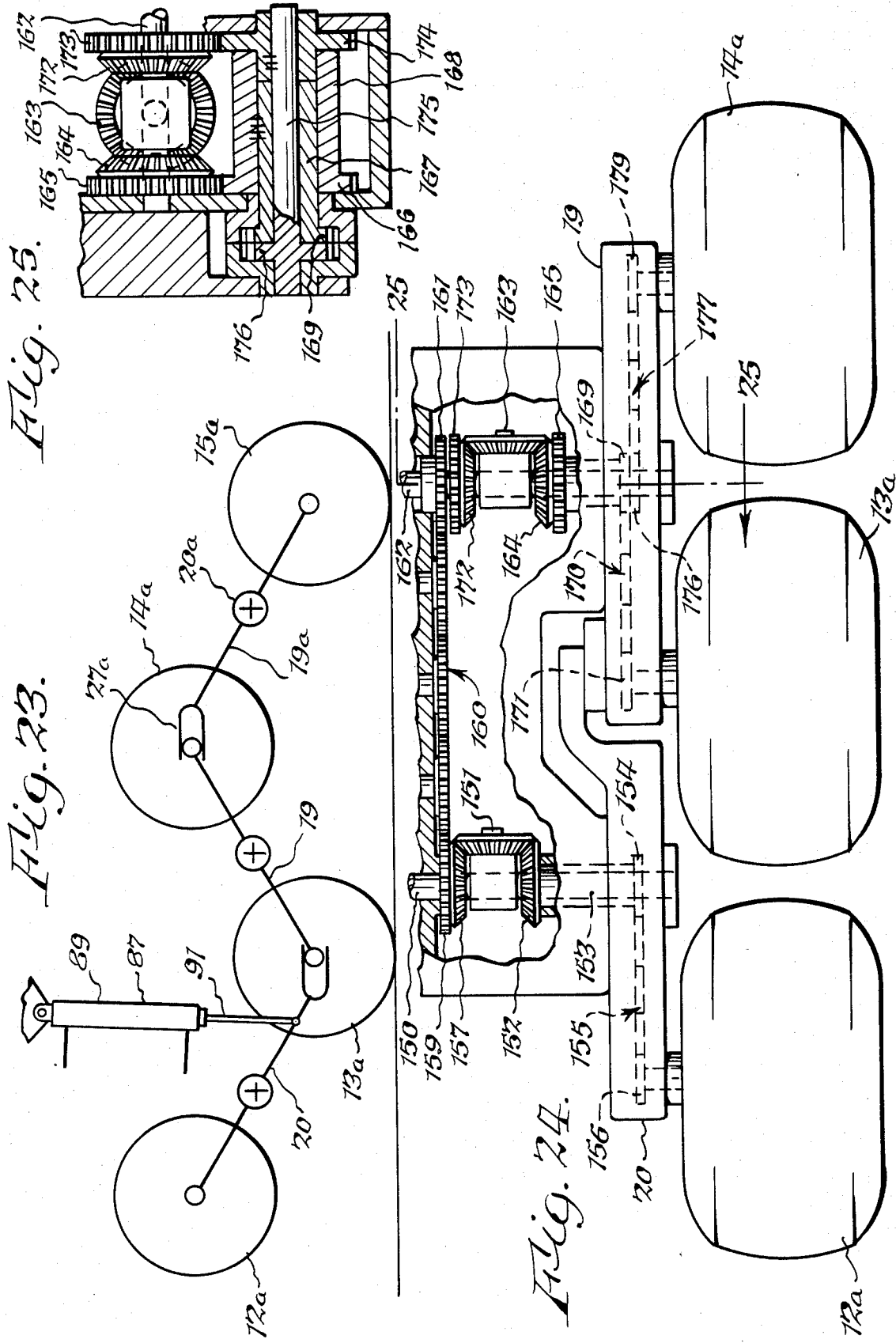

ALL-TERRAIN VEHICLE

BACKGROUND OF THE INVENTION

The present invention relates to a six-wheeled all-terrain vehicle.

By way of background, conventional six-wheeled vehicles having round wheels are generally known. However, such conventional vehicles have limited traction and mobility relative to the oblate-wheeled and round-wheeled vehicles of the present invention when used in cross country or other types of operation.

SUMMARY OF THE INVENTION

It is one object of the present invention to provide an improved six-wheeled all-terrain vehicle having three wheels on each side mounted for pivotal movement on bogies so that the vehicle body can be raised as required to clear obstructions on which it may become hung up.

Another object of the present invention is to provide a six-wheeled vehicle with three oblate wheels on each side which has greater traction than six-wheeled vehicles having round wheels.

A further object of the present invention is to provide a six-wheeled all-terrain vehicle with three oblate wheels on each side wherein two of the wheels on each side are mounted on bogies in such a manner that they move bodily equal amounts fore or aft in the same direction as the bogies pivot, in contrast to movement of the other wheel on the same side in an opposite direction so that there is no scuffing relative to the ground of the first two wheels.

Yet another object of the present invention is to provide an improved six-wheeled vehicle having a separate drive mechanism to the oblate wheels on each side of the vehicle which maintains the oblate wheels on each side of the vehicle in predetermined relative orientations to each other in all positions thereof.

A still further object of the present invention is to provide an improved multi-wheeled all-terrain vehicle having at least three wheels on each side wherein the wheels, either round or oblate, are mounted in bogies which include gearing therein for positively driving all of the wheels.

Another object of the present invention is to provide a six-wheeled vehicle having three round wheels on each side mounted on pivotal bogies in such a manner that two of the wheels will move fore and aft equal amounts in the same direction as the bogies pivot while the other wheel moves an equal amount in the opposite direction and which utilizes differential gearing between the first two mentioned wheels and the last mentioned wheel so that there is no scuffing relative to the ground of any of the wheels during the foregoing fore and aft action.

A still further object of the present invention is to provide an improved multi-wheeled all-terrain vehicle having at least three wheels on each side wherein certain of the wheels on each side can be raised or lowered relative to the other wheels to overcome bogging down in axle deep soft soil or mud.

Yet another object of the present invention is to provide an all-terrain multi-wheeled vehicle having at least three round wheels on each side wherein certain of the wheels can be raised off of the ground to permit the vehicle to run on the remaining wheels on roadways or level ground.

Another object of the present invention is to provide an improved six-wheeled all-terrain vehicle wherein the wheels are mounted on bogies and wherein a plurality of differentials are connected to all of the wheels to permit them to rotate independently of each other. Other objects and attendant advantages of the present invention will readily be perceived hereafter.

The present invention relates to a vehicle comprising a vehicle body, a plurality of wheels on each side of said vehicle body, a plurality of bogies mounted for pivotal movement on each side of said vehicle body, means mounting said plurality of wheels for rotation on said plurality of bogies, and means interconnecting said bogies to cause said bogies to pivot simultaneously on said vehicle body.

The present invention also relates to a six-wheeled vehicle comprising a vehicle body having opposite sides, first and second bogies on each of said opposite sides, first and second longitudinally spaced axles on each of said sides mounting central portions of each of said first and second bogies, respectively, for pivotal movement so that each of said six wheels will always engage the ground regardless of the unevenness thereof, each of said bogies having inner and outer ends, means mounting an outer wheel for rotation on each outer end of each of said first and second bogies, means mounting an inner wheel on the inner end of said second bogie, said inner and outer wheels being of oblate configuration and including longitudinal axes, said longitudinal axes of said inner wheels on each side of said vehicle always being substantially perpendicular to said longitudinal axes of said outer wheels on the same side of said vehicle in all rotational positions thereof.

The present invention also relates to an all-terrain vehicle comprising a vehicle body, a plurality of beams, means pivotally mounting said beams on said vehicle body, wheel means on said beams, second means rotatably mounting said wheel means on said beams, engine means on said vehicle body for producing motion, and gear means in said beams coupled to said engine means for transferring motion from said engine means to said wheel means.

The present invention also relates to a wheel suspension for a vehicle having a power source, a wheel suspension comprising a bogie having a central portion and opposite end portions, means for pivotally mounting said central portion of said bogie on said vehicle body, first and second wheels mounted on said opposite end portions, first and second means in said bogie for driving said first and second wheels, respectively, and a differential located between said power source and said first and second means to permit relative rotational movement of said first and second wheels.

The various aspects of the present invention will be more readily understood when the following portions of the specification are read in conjunction with the accompanying drawings wherein:

BRIEF DESCRIPTION OF THE DRAWINGS

FIG. 1 is a partial side elevational view of an all-terrain six-wheeled vehicle having three oblate wheels mounted on two bogies on each side of a vehicle body;

FIG. 2 is a fragmentary plan view of one side of a six-wheeled all-terrain vehicle taken substantially in the direction of arrows 2—2 of FIG. 1 and showing the three wheels of FIG. 1 and their associated bogies;

FIG. 3 is a fragmentary view, partially in cross section taken substantially along line 3—3 of FIG. 2 and showing the gearing associated with certain of the wheels;

FIG. 4 is a fragmentary view, partially in cross section taken substantially along line 4—4 of FIG. 2 and showing the gearing associated with one of the wheels;

FIG. 5 is a fragmentary view partially in cross section taken substantially along line 5—5 of FIG. 1 and line 5—5 of FIG. 9 and showing the gear drives associated with the wheels on one side of the vehicle;

FIG. 6 is a view similar to FIG. 1 and showing the wheels and bogies in positions which are different from FIG. 1 with the corresponding wheels being 90° removed from the positions of FIG. 1;

FIG. 7 is a fragmentary view partially in cross section taken substantially along line 7—7 of FIG. 2 and showing the connection between the parallelogram linkage and one of the bogies in the position of FIG. 1;

FIG. 8 is a fragmentary view similar to FIG. 7 and showing the parallelogram linkage and the bogies the position of FIG. 6;

FIG. 9 is a fragmentary cross sectional view taken substantially along line 9—9 of FIG. 5 and showing part of the gearing for driving the three wheels on one side of the all-terrain vehicle;

FIG. 9A is a schematic view showing how the oblate gears associated with the gear trains mesh with an oblate driver gear;

FIG. 10 is a fragmentary cross sectional view taken substantially along line 10—10 of FIG. 9;

FIG. 11 is a fragmentary cross sectional view taken substantially along line 11—11 of FIG. 9;

FIG. 12 is a fragmentary cross sectional view taken substantially along line 12—12 of FIG. 9;

FIG. 13 is a schematic view of three wheels on one side of a six-wheeled all-terrain vehicle with structure for positively varying the angles of the bogies with the bogies assuming a substantially horizontal position;

FIG. 14 is a schematic view similar to FIG. 13 but showing the bogies in positions wherein the outer wheels are elevated;

FIG. 15 is a view similar to FIG. 14 but showing the bogies in positions wherein the outer wheels are elevated still further;

FIG. 16 is a view similar to FIG. 13 but showing the bogies in a position wherein the center wheel is elevated so as to raise the vehicle body;

FIG. 17 is a view similar to FIG. 5 but showing one side of an all-terrain six-wheeled vehicle having round wheels and also having a differential drive between the two left wheels and the right wheel;

FIG. 18 is a fragmentary view partially in cross section taken substantially along line 18—18 of FIG. 17;

FIG. 19 is a fragmentary cross sectional view taken substantially along line 19—19 of FIG. 18 and showing additional portions of the drive gearing;

FIG. 20 is a schematic view showing the increments of movements of the wheels on the bogies in response to changes in angles of the latter;

FIG. 23 is a schematic view of another embodiment of the present invention wherein four wheels are mounted on three bogies on each side of the vehicle;

FIG. 24 is a fragmentary plan view showing three wheels on one side of a six-wheeled vehicle having two differentials to permit independent rotational movement of each of the wheels on each side; and FIG. 25 is a fragmentary cross sectional view taken substantially along line 25—25 of FIG. 24.

DESCRIPTION OF THE PREFERRED EMBODIMENTS

Figure 21:
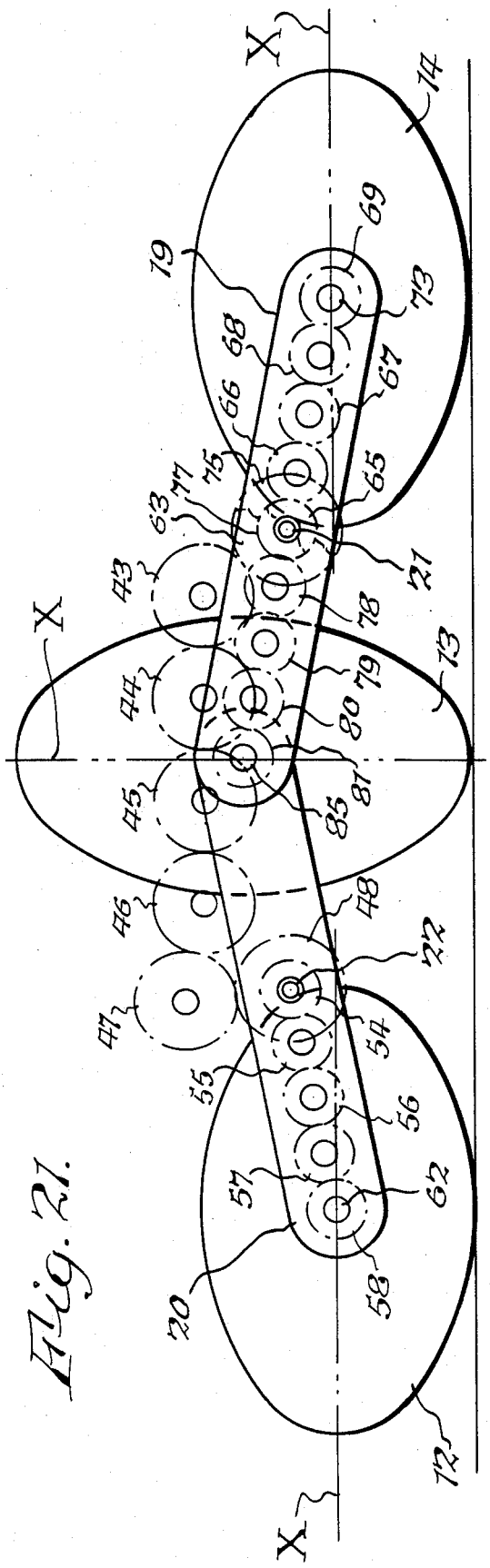
FIG. 21 is a schematic view showing the attitudes of the oblate wheels one orientation of the bogies.

The six-wheeled all-terrain vehicle 10 of FIGS. 1-12 includes a vehicle body 11 having three oblate wheels 12, 13 and 14 on one side of the centerline 15 of body 11 and three corresponding identical oblate wheels (not all shown) on the opposite side of centerline 15 of vehicle body 11. However, vehicle wheels 12' and 13', which are the counterparts of wheels 12 and 13, respectively, are shown in FIG. 3. All six of the vehicle wheels will be in contact with ground at all times as the vehicle travels. Oblate wheels are wheels which by definition have their poles flattened and they may therefore be elliptical or of any other suitable shape within the foregoing definition. Oblate wheels are desirable because of their ability to provide greater traction than round wheels on off-road terrain. This greater traction is due to two factors. The first is that the wheels dig into the ground better than round wheels when they are in the vertical orientation of wheel 13 in FIG. 1. The second is that they have greater contact with the ground than round wheels when they are in the orientation of wheels 12 and 14 in FIG. 1. Thus the oblate wheels will give greater cross country mobility than round wheels.

The major axis X of oblate wheel 14 and the major axis of its counterpart on the opposite side of the vehicle do not have to be substantially parallel in all rotational positions thereof. The major axis X of oblate wheel 12 and the major axis of its counterpart (not shown) on the opposite side of the vehicle do not have to be substantially parallel in all rotational positions thereof. The major axis X of oblate wheel 13 (FIG. 2) and the major axis of its counterpart oblate wheel 13' (FIG. 3) do not have to be substantially parallel in all rotational positions thereof. In other words, the axes of the counterparts of the corresponding wheels on opposite sides of the vehicle can be oriented in any possible relationship to each other in operation, and they do not have to be substantially parallel to each other. Stated otherwise, the wheels on one side of the vehicle do not have to be synchronized in any manner whatsoever with the wheels on the opposite side of the vehicle. The minor axes of all of the wheels are designated by Y.

The gearing arrangement, which will be described hereafter, among the various wheels is such that, in all rotational positions, the major axes of wheels 12 and 14 are always parallel to each other or in line with each other, the latter being shown in FIG. 1. The same is true of the counterparts of wheels 12 and 14 on the opposite side of the vehicle. In addition, the major axes of oblate wheels 12 and 14 always extend substantially perpendicularly to the major axis X of oblate wheel 13 in all rotational positions thereof, to thereby cause this side of the vehicle body to be maintained at substantially the same elevational position during movement along level ground 17 as these wheels rotate, as can be seen from a comparison of FIGS. 1 and 6. The same is true of the counterpart 13' of wheel 13. Thus, both sides of the vehicle body are maintained at a substantially constant elevation above level ground as the wheels on opposite sides of the vehicle rotate. This action is due to the fact that wheels 13 and 14 are mounted on the inner and outer ends, respectively, of beam or bogie 19 which is pivotally mounted on standard 16 of vehicle body 11 at 21, and wheel 12 is mounted on beam or bogie 20 which is pivotally mounted on standard 18 of vehicle body 11 at 22. The bogies 19 and 20 pivot between the positions of FIGS. 1 and 6 as the wheels rotate, and this pivotal movement compensates for the changing elevations of the axles of the oblate wheels to maintain the elevation of the vehicle body 11 constant on level ground. The same is true of the counterparts of wheels 12, 13 and 14 on the opposite side of the vehicle which are mounted on counterparts of bogies 19 and 20. Restating the foregoing, the wheel axes of corresponding wheels on opposite sides of the vehicle do not have to be parallel to each other in operation, and regardless of their positions, the axles of bogies 19 and 20 and their axles of their counterparts on opposite sides of the vehicle body will remain at a constant elevation above level ground as the wheels rotate. Furthermore, all six wheels will maintain contact with the ground, within reason, because of the pivotal action of bogies 19 and 20.

The inner ends of beams or bogies 19 and 20 are coupled to each other through a parallelogram linkage and associated structure so that they will always be inclined at substantially the same angle to a horizontal centerline 24 (FIGS. 1 and 7) extending through the center of pin 25 formed at the inner end of bogie 19 (FIG. 5) and which essentially connects bogies 19 and 20. The maintaining of the same angle of bogies 19 and 20 as they pivot, for purposes which will be described hereafter, is effected by a parallelogram type linkage consisting of a first link 27 having one end pivotally mounted at 29 on standard 18 of the vehicle body and its opposite end pivotally connected at 30 to vertical link 31, the opposite lower end of which is journalled at 32 (FIG. 5) in the inner end of bogie 20. The lower end of link 31 is also formed into a slotted extremity 33 (FIGS. 7 and 8) having slot 34 which receives pin portion 25 formed at the inner end of bogie 19 (FIG. 5). The slot 34 within slotted member 33 always remains horizontal as bogies 19 and 20 pivot because of the parallelogram type linkage discussed above wherein link 27 always remains parallel to bogie 20. Thus since pin portion 25 travels back and forth in slot 34, the longitudinal axes of bogies 19 and 20 will always be at substantially the same angle to horizontal centerline 24 in all of their angular positions. The maintaining of the longitudinal axes of bogies 19 and 20 at the same angle relative to centerline 24 contributes in part to maintaining the above described geometry of the major axes of oblate wheels 12, 13, 14 and their counterparts relative to each other. It will be appreciated that a parallelogram linkage (not shown), which is the mirror image of the above-described parallelogram linkage, is associated with the counterparts of wheels 12, 13 and 14 for the purposes described above. While parallelogram linkages have been shown, it will be appreciated that other linkages can be used which produce the same result.

The gearing arrangement for driving the three oblate wheels 12, 13 and 14 is shown in FIGS. 3–12, and it will be appreciated that mirror image gearing counterparts (not all shown) are associated with the gears for the counterparts of wheels 12, 13 and 14 on the opposite side of centerline 15. Both sets of gears are preferably driven from a common engine (not shown), through the medium of separate clutch-brake mechanisms to each set of gears. Relative to wheels 12, 13 and 14, the engine drives shaft 37 (FIGS. 9 and 10) onto which oblate driver gear 39 (FIGS. 9, 9A and 10) is keyed. Gear 39 is in mesh with oblate gear 40 (FIGS. 9, 9A and 11) and oblate gear 41 (FIGS. 9, 9A and 12) which is mounted on shaft 41'. The outer configurations of gears 40 and 41 match the outer configurations of the oblate wheels 12, 13 and 14 so that as these gears rotate, the oblate wheels 12, 13 and 14 will maintain the relative positions described above. Furthermore, gears 39, 40 and 41 are oriented relative to each other so that the driven gears 40 and 41 are driven at varying speeds to produce varying rotational speeds of the oblate wheels which is necessary to cause them to have a constant surface speed at their outer peripheries. In other words, the oblate gears and the oblate wheels are oriented relative to each other so that the wheels will slow down as the radial distance to the ground increases and vice versa, as this is necessary to maintain a constant peripheral surface speed. Furthermore, the contour of the outer peripheries of wheels 12, 13 and 14 can be generated to compensate for the fore and aft wheel movement described hereafter relative to FIG. 20. While gear 39 is shown as driving gears 40 and 41, an alternate gearing arrangement can be used wherein gear 39 drives one of the gears 40 or 41, and another gear (not shown) similar to gear 39 drives the other gear 40 or 41. In such an arrangement the two gears like 39 can have different characteristics, if desired. In such an arrangement, the two gears like 39 may be mounted next to each other on the same shaft.

Gear 40 is mounted on shaft 42 and is keyed to circular gear 43 which drives gears 44, 45, 46, 47 and 48 which are mounted on shafts 49, 50, 51, 52 and 53, respectively, in vehicle body 11. Gears 48 and 54 (FIG. 5) are keyed to shaft 53 journalled in the vehicle body. Shaft 53 lies on the centerline of pivotal mounting 22 of bogie 20. Gear 54 is mounted on bogie 20 and it drives gears 55, 56, 57 and 58 which are mounted on shafts 59, 60, 61 and 62, respectively, mounted on bogie 20 for movement therewith. Shaft 62 is the axle for oblate wheel 12. It can readily be seen that as bogie 20 pivots about its axle 53, a drive is maintained to axle 62 which drives oblate wheel 12. The relative positions of oblate gears 39 correspond to the position of oblate wheel 12 to cause wheel 21 to have its fastest angular speed in this position. When oblate gears 39 and 40 each move 90°, the minor axis Y of wheel 12 will be perpendicular to the ground (FIG. 6) and the angular speed of wheel 12 will be its slowest. However, as noted above, the peripheral surface speed of oblate wheel 12 will remain constant because of the compensating action of the oblate gearing.

Gear 43 (FIGS. 9 and 11) is in mesh with gear 63 (FIGS. 9 and 5) which is keyed to shaft 64 (FIGS. 5 and 9) and which has gear 65 also keyed thereto. Shaft 64 is coaxial with the pivot 21 of bogie 19. Gear 65 drives gears 66, 67, 68 and 69 which are mounted on shafts 70, 71, 72 and 73, respectively. Shaft 73 is the axle for oblate wheel 14 to which the latter is effectively keyed so that it is driven through the foregoing described train of gears. Thus, there is a positive drive to oblate wheel 14 through the above-described gearing as bogie 19 pivots. It can readily be seen that oblate wheels 12 and 14 maintain the same orientation in all rotational positions because they are driven from oblate gear 40. The same rotational characteristics described above relative to oblate gear 40 and oblate wheel 12 are equally applicable to oblate gear 40 and oblate wheel 14.

A gear 74 (FIGS. 9 and 12) is effectively keyed to oblate gear 41 on shaft 41'. Gear 74 is in mesh with gear 75 (FIG. 12) which is keyed to hollow shaft or sleeve 76

(FIGS. 5 and 10) to which a gear 77 (FIGS. 55 and 10) is also keyed. Hollow shaft 76 is rotatably mounted on shaft 64. Gear 77 drives gears 78, 79, 80 and 81 which are mounted on shafts 82, 83, 84 and 85, respectively. Gear 81 is keyed to shaft 85 which is also keyed to wheel 13 to thus drive the latter. Shaft 85 is the axle for wheel 13. The orientation of oblate gears 39 and 41 (FIG. 9A) is 90° different from the orientation between oblate gears 39 and 40, and as can be seen from FIG. 1, the oblate wheel 13 which is driven by oblate gear 41 is oriented in a position which is 90° different from the positions of oblate wheels 12 and 14. Thus the rotational speed of wheel 13 will vary in an opposite direction to the rotational speeds of wheels 12 and 14 to maintain the same peripheral speed in all rotational positions thereof, which is the same peripheral speed as wheels 12 and 14. In other words, as the rotational speeds of wheels 12 and 14 increase to maintain a constant peripheral speed, the rotational speed of wheel 13 will decrease to maintain a constant peripheral speed which is equal to the peripheral speed of wheels 12 and 14, and vice versa.

Stating the foregoing differently, a comparison of FIGS. 1 and 9A, which represents the relative positions of oblate gears 39, 40 and 41 corresponding to the relative positions of oblate wheels 12, 13 and 14, reveals that the major axis of oblate gear 40 is aligned with the minor axis of driver gear 39 when the major axes X of the outer wheels 12 and 14 are horizontal, and the minor axis of oblate gear 41 is aligned with the major axis of driver gear 39 when the major axis X of inner wheel 13 is vertical. The foregoing relationship of the oblate gears is shown by the centerlines a, b and c in FIG. 9A and by the major axes X and minor axes Y of the wheels in FIG. 1.

Summarizing the above described gearing of the foregoing figures, it can thus be seen that a positive drive is maintained to each of the oblate wheels 12, 13 and 14 in all pivotal positions of bogies 19 and 20. As further mentioned above, counterparts (not all shown) of the above-described gearing are associated with the counterparts of oblate wheels 12, 13 and 14 and counterparts of bogies 19 and 20 on the opposite side of the centerline 15 of the vehicle body 11. Certain of the counterpart gears are shown in FIG. 3. The mesh of the above-described gearing will maintain the above-described relationship among the axes of all the vehicle wheels as the bogies 19 and 20 pivot back and forth while they maintain equal inclinations to the horizontal axis of the vehicle body, as expressed above.

Figure 22:
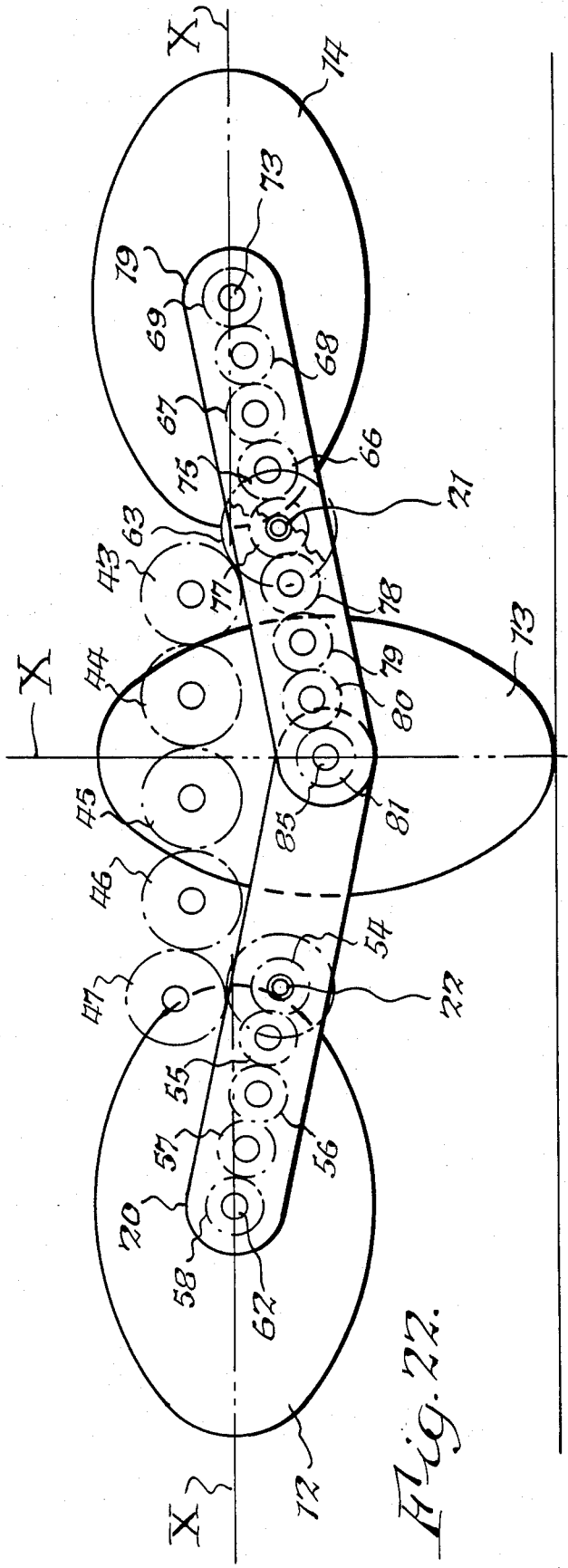
FIG. 22 is a schematic view of the attitudes of the oblate wheels in another orientation of the bogies.

As can be seen from a comparison of FIGS. 21 and 22, the axes of oblate wheels 12, 13 and 14 on the side of the vehicle will be maintained in the above-discussed synchronism in all attitudes of the bogies 19 and 20 as they pivot. In other words, assuming the bogies 19 and 20 pivot about their axles 21 and 22, respectively, from the position of FIG. 21 to the position of FIG. 22, the gear trains discussed above will cause the axes X of wheels 12, 13 and 14 to be maintained in the same relative orientation in all rotational positions thereof. Viewing this differently, even though the wheels 12, 13 and 14 may not be driven, if the bogies pivot, the gearing between the wheels will cause them to retain their predetermined orientation discussed above, and this orientation is maintained as the wheels are driven and as the bogies 19 and 20 pivot. The same is true for the counterpart wheels and bogies on the opposite side of the vehicle.

In FIG. 20 the relationship of the various wheels at various inclinations is schematically shown. When bogies 19 and 20 are in a horizontal attitude, wheels 12, 13 and 14 are in the relative positions designated by these numerals. When bogie 19 pivots to the position 19', bogie 20 will pivot to the position 20'. Thus, wheel 12 will move to the right to the position 12', wheel 13 will move to the right to the position 13' and wheel 14 will move to the left to the position 14'. Stated otherwise, wheel 12' moves to the right a distance of A. Wheel 13' will move to the right a distance of B which is equal to distance A, and wheel 14 will move to the left a distance of C which is equal to each of the distances A and B. Since wheels 12 and 14, which are originally at the same inclination as shown in FIG. 1, move the same amounts A and C in opposite directions, they will maintain their parallelism. Furthermore, since wheel 13 moves the same amount as the other two wheels, it will maintain its relative orientation thereto. If the bogies did not maintain their same inclination to the horizontal axis of the vehicle body, as described above, then wheels 12 and 14 would not move equal amounts in opposite directions and thus also would not maintain their same inclination relative to each other. When bogie 19 pivots to the position 19", bogie 20 will pivot to the position 20" so that its wheel 12 will move to the Wheel 13 will move to the position 13", and it too will move to the right a distance B which is equal to the distance A. Wheel 14 will move to the left to position 14" an amount equal to the distance C which is equal to each of the distances A and B. In all positions of the bogies between their extreme limits of movement, wheels A and B will always move in the same direction equal amounts which is equal to the amount moved by wheel 14 in the opposite direction. It is to be noted that when the foregoing shifting of vehicle wheel position occurs, there is a shifting of the points of ground contact with an accompanying shifting of the vehicle weight to such new points of ground contact which in turn provides greater traction.

The maintaining of the distances A and B substantially equal while the wheels 12 and 13 move in the same direction prevents scuffing as between them. However, vehicle wheel C will be moving in an opposite direction and thus it will scuff because the two wheels 12 and 13 have a combined greater traction than wheel 14. However, the advantage is that there is only scuffing at wheel C because wheels A and B are working together and moving the same amounts as the bogies pivot. If the wheels 12 and 13 did not move the same amounts as the bogies pivoted and wheel C also moved a different amount, there would be scuffing of all three wheels relative to the ground. The reason that the wheels 12, 13 and 14 move equal amounts, as described above, is because the bogies 19 and 20 maintain equal inclinations to the horizontal in all positions thereof due to the action of the parallelogram linkage. However, it will be appreciated that other linkages may be used to maintain the equal inclination relationship.

As mentioned previously above, the advantage of the oblate wheels is that they can dig into the ground as they rotate, thus providing the vehicle with much greater traction than one having round wheels. However, because of the pivotal action of bogies 19 and 20 and their counterparts, the vehicle body will remain substantially level as the vehicle travels across level ground 17. However, even if the ground is not level, the bogie construction of FIGS. 1–12 will cause each of the six vehicle wheels to maintain good solid contact with the ground, and they will provide greater traction than round wheels, especially when used off road on country terrain.

In FIGS. 13-16 a modification is disclosed which is usable equally with the embodiment of FIGS. 1-12 and the embodiment of FIGS. 17-19 to be described hereafter having round wheels. It will be appreciated however that the round wheels 12a, 13a and 14a of FIGS. 13-16 are for illustration purposes only but these figures are intended to also be applicable to the oblate wheels of FIGS. 1-12. The weight distribution of all embodiments due to the above-described bogie construction is generally, with certain exceptions noted hereafter, that there is twice the weight on the central wheel 13 and its counterpart 13' than on the wheels 12 and 14 and their counterparts. This facilitates travel over country terrain because the front or rear of the vehicle can rise more easily over obstructions. In other words, the front or rear wheels do not dig into the ground as much as they would if they were carrying greater weights. Furthermore, the weight distribution provides easier steering. The various weight distributions which are possible are shown in FIGS. 13, 15 and 16. In FIG. 13, the total weight 4X of the vehicle, when on level ground, is distributed in an amount of 2X to the central wheels and 1X each to the outer wheels. In FIG. 15, where the outer wheels are raised to a great height, substantially the total weight 4X of the vehicle is borne by the central wheels. In FIG. 16, the total weight 4X of the vehicle is borne equally in an amount of 2X each by the outer wheels.

The bogies 19 and 20 are shown in FIGS. 13-16, and a linkage 88 is shown therebetween, which is intended to represent the parallelogram linkage described above. A fluid motor 87 has a cylinder 89 having an end pivotally attached at 90 to vehicle body 11 and a piston 91 attached to bogie 20. Thus, by actuating fluid motor 87, bogies 19 and 20 can be held in horizontal positions for travel on level ground 92 when circular wheels are mounted thereon. Also, if for example there is an obstruction, such as 93 or 94, as the vehicle is moving to the left or to the right, respectively, in FIG. 14, fluid motor 87 can be actuated to raise the wheels proximate obstructions 93 or 94 to facilitate the vehicles climbing over these obstructions. In this situation, more weight of the vehicle is effectively shifted to central wheel 13a to facilitate riding over the obstructions. FIG. 15 shows the outer vehicle wheels raised even higher to overcome even greater obstructions. In fact, the bogies can be moved to the 45° angle of FIG. 15 so that the outer wheels 12a and 14a are raised a distance which is almost equal to their height, and in this position, the outermost peripheries of the wheels essentially lie on a radius R and thus are equivalent, in combination, to one large wheel of this radius, which enables the vehicle to climb over extremely high obstructions.

In FIG. 16 the fluid motor actuates bogies 19 and 20 to raise the vehicle body to a greater elevation than shown in FIGS. 13-15 so as to dislodge the vehicle body from an obstruction which may be bearing against its underside. It will be appreciated that if the vehicle body comes to rest on an obstruction, the rotation of the vehicle wheels may not be sufficient to dislodge it. Therefore raising the vehicle body from the obstruction, as shown in FIG. 16, will permit the outer vehicle wheels 12 and 14 to provide greater traction. The fluid motor may be actuated by manual controls, or by a computer which is responsive to the resistance experienced by the outer wheels 12 or 14, depending on the direction of vehicle travel.

The raising or lowering of the bogies in the abovedescribed manner is especially effective for "brake-clutch" type of turning of the vehicle, wherein the wheels on one side of the vehicle are braked while the wheels on the opposite side of the vehicle are driven, and such structure can be incorporated into the vehicle. The brake-clutch arrangement may be applied to the main drive shaft D (FIG. 9) and its counterpart (not shown) for each gear 39 and its counterpart (not shown), respectively, which drive the wheels on each side of the vehicle. Thus one of the shafts D may be braked while the other is permitted to drive its associated gear train. Furthermore, if desired, each of the wheels can be braked individually to give the vehicle greater braking power. The wheels on each side of the vehicle can be controlled independently, so that, for example, the two outer wheels 12 and 14 can be raised on one side of the vehicle wheel while the wheels on the other side of the vehicle remain in contact with the ground so as to permit the vehicle to be turned about the vertical axis of center wheel 13 by braking this wheel while driving the wheels on the opposite side of the vehicle. Furthermore, by the use of the motor 87, the bogies can be locked at a given elevation, as in FIG. 16, so that the vehicle can be driven on four wheels, rather than six, under certain circumstances. Additionally, by raising the outer wheels, they can be extricated from soft soil which is higher than the wheel axles. While a fluid motor has been shown for moving the bogies, it will be appreciated that other types of mechanical or electromechanical devices can be used. Furthermore, computer controls may be associated with the motor which controls the position of the bogies so as to cause them to be temporarily held against pivoting when greater traction is desired or to cause them to be moved to positions such as shown in FIGS. 14-15 for the above-discussed purposes.

When the bogies carry oblate wheels and are locked in a given position by the motor, such as 87, the driven oblate wheels 12, 13 and 14 and their counterparts will create a digging action in the ground which can result in still greater traction than when the bogies are allowed to pivot. Furthermore, when the vehicle is stationary, by pivoting the bogies by the use of a motor 87 or its equivalent, the outer wheels may be made to approach or recede from each other to cause them to either move away from an obstruction or lift over an obstruction. The bogies can also be caused to pivot back and forth while the vehicle is stationary to jockey the wheels back and forth, as may be required to extricate the vehicle from mud or snow. Additionally, moving the bogies by the motor shifts the vehicle's weight distribution on the wheels, which can be used for optimum operation and can also be used in the laboratory as a research tool.

In FIGS. 17-19 a modified embodiment of the present invention is disclosed which has round vehicle wheels 12a, 13a and 14a on one side of vehicle body 11a and corresponding mirror image round vehicle wheels on the opposite side of vehicle body centerline 15a. The drive to vehicle wheels 12a, 13a and 14a is from a suitable engine through shaft 97 and differential 99. A mirror image drive (not shown) is located on the opposite side of centerline 15a to drive the counterparts of vehicle wheels 12a, 13a and 14a. More specifically relative to wheels 12a, 13a and 14a, a gear 100 is keyed to gear 101 of the differential, and a gear 102 is keyed to gear 103 of the differential. When wheels 12a, 13a and 14a are not slipping relative to each other, gears 100 and 102 will be driven by the differential without relative movement therebeween, as is well known. Gear 100 is in mesh with gear 110 (FIG. 18) which is keyed to shaft 104 and which has gear 105 keyed thereon. Gear 105 on shaft 104 drives gears 106, 107, 108 and 109 which are mounted on shafts 111, 112, 113 and 114, respectively, in bogie 19a. Shaft 104 lies on the centerline of the axle for bogie 19a. Shaft 114 is the axle for wheel 14a which it drives.

A gear 115 is in mesh with gear 102 and this gear is keyed to sleeve 116 which has gear 117 keyed thereto. Sleeve 116 is rotatable on shaft 104. Gear 115 drive gear 118 (FIG. 19) which in turn drives gear 119 which is keyed to shaft 120 onto which gear 121 is also keyed. A gear train generally depicted by numeral 122 extends between gear 121 and gear 123 keyed to shaft 124 which also has gear 125 keyed thereon. Shaft 124 is also on the centerline for the axle for bogie 20a. Gear 125 drives gears 126, 127, 128 and 129 which are mounted on shafts 130, 131, 132 and 133, respectively, in bogie 20a. Shaft 133 is driven by gear 129 and serves as the axle which drives wheel 12a. As noted above, gear 117 is keyed to sleeve 116 with gear 115 and, as gear 115 is driven, gear 117 drives gears 135, 136, 137 and 138 which are mounted on shafts 139, 140, 141 and 142, respectively. Shaft 142 has gear 138 keyed thereon and serves as the axle which drives wheel 13a.

Because the bogie construction 19a-20a of FIGS. 17-19 is identical to that described above relative to FIGS. 1-12, which includes the parallelogram linkage, the same action will be obtained as described above relative to FIG. 20, namely, as the bogies pivot back and forth about their axles in following the terrain, wheels 12a and 13a will move equal amounts in the same direction and wheel 14a will move an equal amount in the opposite direction, as explained above relative to FIG. 20. However, since there is a differential 99 which is effectively interposed between wheel 14a on one hand, and wheels 12a and 13a on the other hand, the scuffing between these wheels which move in opposite directions will be eliminated. In other words wheels 12a and 13a moving in the same direction the same amounts in unison as bogies 19a and 20a pivot would tend to drag wheel 14a which moves in the opposite direction. The differential 99 eliminates the drag. If wheels 12a and 13a did not move the same amounts in the same direction, there could be scuffing therebetween, and the use of the parallelogram linkage eliminates such scuffing between wheels 12a and 13a because it causes them to move equal amounts as they move in the same direction.

In FIG. 23 a modified embodiment of FIGS. 13-16 is disclosed. This embodiment includes portions which are identical to structure in those figures and such identical structure bear identical numerals and operate in the same manner. However, the vehicle includes an additional wheel 15a which is mounted at the outer end of bogie 19a which is pivotally mounted on the vehicle body at 20a, the other end of bogie 19a being connected to bogie 19 by means of a parallelogram type of linkage designated by numeral 27a which is identical to that described above relative to FIGS. 1-12. A suitable gearing arrangement (not shown) is provided in bogie 19a for positively driving wheel 15a, and gearing such as shown in the preceding figures positively drives wheels 12a, 13a and 14a.

In FIG. 24 a modified embodiment of the structure of FIGS. 17-19 is shown. The embodiment of FIG. 24 includes gearing for driving each of the wheels 12a, 13a and 14a independently of each other. In this respect, a shaft 150 is driven from a main power source of the vehicle, and it drives differential 151. Gear 152 of the differential is coupled to shaft 153 which has gear 154 mounted at the outer end thereof. Gear 154 drives gear train 155 which in turn drives gear 56 keyed to the axle of wheel 12a which is thus driven.

Gear 157 of differential 151 is keyed to gear 159, both of which are rotatable on shaft 150. Gear 159 drives gear train 160 which in turn drives gear 161 keyed to shaft 162 which drives differential 163. Gear 164 of differential 163 has gear 165 keyed thereto which in turn drives gear 166 mounted on sleeve 168 which is keyed to sleeve 167 which has gear 169 keyed thereto. Gear 169 drives gear train 170 which in turn drives gear 171 keyed to the axle which mounts wheel 13a to thus drive the latter. Gear 172 of differential 163 has gear 173 keyed thereto which drives gear 174 keyed to shaft 175 which extends through sleeve 167 and has gear 176 keyed thereto. Gear 176 drives gear train 177 which in turn drives gear 179 keyed to the axle of wheel 14a which is thus driven. Thus, each wheel 12a, 13a and 14a is driven independently by the use of two differentials 151 and 163 while permitting relative rotational movement among the three wheels 12a, 13a and 14a, thereby obviating any possible scuffing among them as the bogies 19 and 20 pivot during operation.

It will be appreciated that the three wheels on the opposite side of the vehicle which correspond to wheels 12a, 13a and 14a are driven by two additional differentials corresponding to differentials 151 and 163, as described above for the latter.

It can thus be seen that the improved vehicles of the present invention are manifestly capable of achieving the above enumerated objects, and while preferred embodiments of the present invention have been disclosed, it will be appreciated that it is not limited thereto but may be otherwise embodied within the scope of the following claims.

What is claimed is:

1. A six-wheeled vehicle comprising a vehicle body having opposite sides, first and second bogies on each of said opposite sides, first and second longitudinally spaced axles on each of said sides mounting central portions of each of said first and second bogies, respectively, for pivotal movement, each of said bogies having inner and outer ends, means mounting an outer wheel for rotation on each outer end of each of said first and second bogies, means mounting an inner wheel on the inner end of said second bogies, and linkage means coupled relative to said first and second bogies for causing said first and second bogies on each side of said vehicle to always extend at a substantially equal angle to the horizontal in all angular positions of said first and second bogies to thereby cause said outer wheel of said first bogie and said inner wheel to move same amounts in equal direction as said bogies pivot and to cause said outer wheel of said second bogie to move the same amount in the opposite direction as said bogies pivot.

2. A six-wheeled vehicle as set forth in claim 1 wherein said inner and outer wheels are of oblate configuration and include longitudinal axes, and driving means for driving said inner and outer wheels on each side of said vehicle with said longitudinal axes of said inner wheels always extending transversely to he axes of said outer wheels in all rotational positions of said wheels.

3. A six-wheeled vehicle as set forth in claim 2 wherein said longitudinal axes of said inner wheels always extend substantially perpendicularly to the axes of said outer wheels in all rotational positions thereof.

4. A six-wheeled vehicle as set forth in claim 2 wherein said driving means comprise a first gear train coupled to said outer wheel on said first bogie, a second gear train coupled to said inner wheel on said second bogie, and a third gear train coupled to said outer wheel on said second bogie.

5. A six-wheeled vehicle as set forth in claim 4 wherein portions of said first gear train are located in said first bogie, and wherein portions of said second and third gear trains are located in said second bogie.

6. A six-wheeled vehicle as set forth in claim 4 wherein said driving means include first and second oblate gears, and wherein said first oblate gear is coupled to said first and third gear trains, and wherein said second oblate gear is coupled to said second gear train.

7. A six-wheeled vehicle as set forth in claim 6 wherein portions of said first gear train are located in said first bogie, and wherein portions of said second and third gear trains are located in said second bogie.

8. A six-wheeled vehicle as set forth in claim 6 including oblate driver gear means for driving said first and second oblate gears.

9. A six-wheeled vehicle as set forth in claim 8 wherein said first and second oblate gears and said oblate driver gear means have major and minor axes, and wherein said oblate wheels have major and minor axes, and wherein said major axis of said first oblate gear is aligned with said minor axis of said driver gear means when the major axes of said outer wheels are horizontal, and wherein said major axis of said driver gear means is aligned with said minor axis of said second oblate gear when said major axis of said inner wheel is vertical.

10. A six-wheeled vehicle as set forth in claim 8 wherein said first gear train includes first gear means effectively coupled between said first oblate gear and the remainder of gears of said first and third gear trains, and wherein said second gear train includes second gear means effectively coupled between said second oblate gear and the remainder of gears of said second gear train, said first gear means comprising a first gear keyed to said first oblate gear, and said second gear means comprising a second gear keyed to said second oblate gear.

11. A six-wheeled vehicle as set forth in claim 1 wherein said linkage means comprises a parallelogram linkage including a first link having first and second ends with said first end pivotally mounted on said vehicle body, a second link having first and second ends with said first end pivotally mounted to said second end of said first link and with said second end pivotally mounted on said inner end of said first bogie so that said first link always remains parallel to said first bogie in all angular positions thereof, and a pin and slot connection between said second end of said second link and said inner end of said second bogie.

12. A six-wheeled vehicle as set forth in claim 2 including means for positively adjusting the angular positions of said first and second bogies and maintaining said first and second bogies in said adjusted position.

13. A six-wheeled vehicle as set forth in claim 1 including means for positively adjusting the angular positions of said first and second bogies and maintaining said first and second bogies in said adjusted position.

14. A six-wheeled vehicle as set forth in claim 1 wherein said inner and outer wheels are round.

15. A six-wheeled vehicle as set forth in claim 14 including driving means for positively driving all of said inner and outer wheels.

16. A six-wheeled vehicle as set forth in claim 15 wherein said driving means comprise first and second and third gear trains on one side of said vehicle, said first gear train driving said outer wheel mounted on said first bogie, said second gear train driving said inner wheel mounted o said second bogie, and said third gear train driving said outer wheel mounted on said second bogie, and differential gearing effectively interposed between said third bear train, on one hand, and said first and second gear trains, on the other hand, so that there can be relative rotational movement between said outer wheel on said second bogie, on one hand, and said outer wheel on said first bogie and said inner wheel on said second bogie, on the other hand, and corresponding driving means on the opposite side of said vehicle.

17. A six-wheeled vehicle as set forth in claim 16 wherein portions of said first gear train is housed in said first bogie, and wherein portions of said second and third gear trains are housed in said second bogies.

18. A six-wheeled vehicle as set forth in claim 16 including means for positively adjusting the angular positions of said first and second bogies and maintaining said first and second bogies in said adjusted position.

19. A six-wheeled vehicle as set forth in claim 15 including means for positively adjusting the angular positions of said first and second bogies and maintaining said first and second bogies in said adjusted position.

20. A six-wheeled vehicle comprising a vehicle body having opposite sides and three wheels on each side, first and second bogies on each of said opposite sides, first and second longitudinally spaced aisles on each of said sides mounting central portions of each of said first and second bogies, respectively, for pivotal movement, each of said bogies having inner and outer ends, means mounting an outer wheel for rotation on each outer end of each of said first and second bogies, means mounting an inner wheel on the inner end of each of said second bogies, said inner and outer wheels being of oblate configuration and including longitudinal axes, and means for driving said wheels with said longitudinal axes of said inner wheels on each side of said vehicle always being substantially perpendicular to said longitudinal axes of said outer wheels on the same side of said vehicle in all rotational positions thereof.

21. A six-wheeled vehicle as set forth in claim 20 wherein said driving means comprise a first gear train coupled to said outer wheel on said first bogie, a second gear train coupled to said inner wheel on said second bogie, and a third gear train coupled to said outer wheel on said second bogie.

22. A six-wheeled vehicle as set forth in claim 21 wherein said first and second and third gear trains include first and second oblate gears.

23. A six-wheeled vehicle as set forth in claim 22 including oblate driver gear means for driving said first and second oblate gears.

24. A six-wheeled vehicle as set forth in claim 23 wherein said first and second oblate gears and said oblate driver gear means have major and minor axes, and wherein said oblate wheels have major and minor axes, and wherein said major axis of said first oblate gear is aligned with said minor axis of said driver gear means when the major axes of said outer wheels are horizontal, and wherein said major axis of said driver gear is aligned with said minor axis of said second oblate gear when said major axis of said inner wheel is vertical.

25. A vehicle comprising a vehicle body having opposite sides, first and second bogies on each of said opposite sides mounting central portions of each of said first and second bogies, respectively, for pivotal movement, each of said first and second bogies having inner and outer ends, means mounting an outer wheel for rotation on each outer end of each of said first and second bogies, means mounting an inner wheel on the inner end of each of said second bogies, first driving means for positively driving all of said inner and outer wheels on one of said sides of said vehicle comprising first drive linkage means coupled to said outer wheel on said first bogie, second drive linkage means coupled to said inner wheel on said second bogie, and third drive linkage means coupled to said outer wheel on said second bogie, and differential gear means effectively interposed between said third drive linkage means, on one hand, and said first and second drive linkage means, on the other hand, so that there can be relative rotational movement between said outer wheel on said second bogie, on one hand, and said outer wheel on said first bogie and said inner wheel on said second bogie, on the other hand, and second driving means corresponding to said first driving means for driving all of said inner and outer wheels on the other side of said vehicle.

26. A vehicle as set forth in claim 25 including fourth drive linkage means for driving said differential gear means, and second differential gear means effectively interposed between said first drive linkage means and said fourth drive linkage means, said second driving means including structure corresponding to said fourth drive linkage means and said second differential gear means.

27. A vehicle comprising a vehicle body having first and second opposite sides, a pair of first bogies having inner and outer ends on said first side, a pair of second bogies having inner and outer ends on said second side, a pair of first pivot means on said first side each mounting one of said first bogies intermediate the ends thereof, a pair of second pivot means on said second side each mounting one of said second bogies intermediate the ends thereof, first means interconnecting said inner ends of said first bogies, second means interconnecting said inner ends of said second bogies, a pair of first wheels mounted on said outer ends of said first bogies, a pair of second wheels mounted on said outer ends of said second bogies, a third wheel mounted on said inner end of one of said first bogies, and a fourth wheel mounted on said inner end of one of said second bogies, said first pivot means being mounted on said vehicle body entirely independently of said second pivot means to thereby permit said first and second bogies to pivot on said vehicle body entirely independently of each other.

28. A vehicle as set forth in claim 27 including a pair of third bogies having outer ends, means pivotally mounting one of said third bogies on each opposite side of said vehicle body, an additional wheel mounted on one outer end of each of said third bogies, and first means interconnecting the other outer end of one of said third bogies to the outer end of one of said first bogies to the outer end of one of said second bogies which are at the opposite ends thereof from said connection between said first bogies and said second bogies.

29. A vehicle as set forth in claim 28 including means on all of said bogies on each side of said vehicle body for driving said wheels.

30. A vehicle as set forth in claim 24 wherein said wheels are round, drive means on said vehicle body, and means coupled between said drive means and said wheels for rotating said wheels.

31. A vehicle as set forth in claim 30 including a first differential coupled between said drive means and one of said first wheels, a second differential coupled between the other of said first wheels and said third wheel, a first drive linkage coupled between said first and second differentials, a thread differential coupled between said one of second wheels and said drive linkage, a fourth differential coupled between the other of said second wheels and said fourth wheel, and a second drive linkage coupled between said second and fourth differentials.

32. In a vehicle body having opposite sides and having a power source, a wheel suspension comprising a bogie having a central portion and spaced portions on opposite sides of said central portion, pivot means having a first axis for pivotally-mounting said central portion of said bogie on one of said sides of said vehicle body, first and second wheels, first and second parallel shafts mounted on said opposite sides of said central portion mounting said first and second wheels, respectively, said first and second shafts being substantially parallel to said pivot means, first and second means on said bogie for driving said first and second wheels, respectively, and a differential located between said power source and said first and second means to permit relative rotational movement of said first and second wheels.

33. In a vehicle body as set forth in claim 32 wherein said first and second means comprise first and second gear trains, respectively.

34. A vehicle comprising a vehicle body having a side; first, second, and third wheels on said side; first, second, and third drive linkage means coupled to said first, second and third wheels, respectively; a power source on said vehicle; first differential gear means coupled between said power source and said first drive linkage means; fourth drive linkage means coupled to said first differential gear means; and second differential gear means coupled between said fourth drive linkage means and said second and third drive linkage means.

35. A vehicle as set forth in claim 27 wherein said first, second, third and fourth wheels are oblate.

36. A vehicle as set forth in claim 35 including first means coupling said first and third wheels to cause said first and third wheels to maintain predetermined orientations relative to each other.

37. A vehicle as set forth in claim 36 including second means coupling said second and fourth wheels to cause said second and fourth wheels to maintain predetermined orientations relative to each other.

38. A vehicle as set forth in claim 37 including mounting means for mounting said first and second means on said vehicle body independently of each other to thereby permit said first and third wheels to vary their orientations relative to said second and fourth wheels.

39. A vehicle as set forth in claim 27 wherein said first and second pivot means are fixedly mounted on said vehicle body.

40. A vehicle as set forth in claim 39 wherein said first, second, third and fourth wheels are oblate.

41. A vehicle as set forth in claim 40 including first means coupling said first and third wheels to cause said first and third wheels to maintain predetermined orientations relative to each other.

42. A vehicle as set forth in claim 41 including second means coupling said second and forth wheels to cause said second and fourth wheels to maintain predetermined orientations relative to each other.

43. A vehicle as set forth in claim 42 including mounting means for mounting said first and second means on said vehicle body independently of each other to thereby permit said first and third wheels to vary their orientations relative to said second and fourth wheels.

44. A vehicle as set forth in claim 27 including third and fourth bogies each having inner and outer ends, third pivot means pivotally mounting said third bogie on one side of said vehicle body, fourth pivot means pivotally mounting said fourth bogie on the opposite side of said vehicle body, fifth and sixth wheels mounted on the outer ends of said third and fourth bogies, respectively, and third and fourth means mounting said inner ends of said third and fourth bogies relative to said outer ends of one of said first and second bogies, respectively.

45. A vehicle as set forth in claim 2 wherein said first and second longitudinally spaced axles on each of said sides of said vehicle body mount said first and second bogies on each of said sides of said vehicle body for pivotal movement independent of the first and second bogies on the opposite side of said vehicle body.

46. A vehicle as set forth in claim 45 wherein said first and second axles on each side of said vehicle body are fixedly mounted thereon against radial movement.

47. A vehicle as set forth in claim 14 wherein said first and second longitudinally spaced axles on each of said sides of said vehicle body mount said first and second bogies on each of said sides of said vehicle body for pivotal movement independent of the first and second bogies on the opposite side of said vehicle body.

48. A vehicle as set forth in claim 20 wherein said first and second longitudinally spaced axles on each of said sides of said vehicle body mount said first and second bogies on each of said sides of said vehicle body for pivotal movement independent of the first and second bogies on the opposite side of said vehicle body.

49. A vehicle as set forth in claim 48 wherein said first and second axles on each side of said vehicle body are fixedly mounted thereon against radial movement.

50. A vehicle as set forth in claim 1 wherein said first and second longitudinally spaced axles on each of said sides of said vehicle body mount said first and second bogies on each of said sides of said vehicle body for pivotal movement independent of the first and second bogies on the opposite side of said vehicle body.

51. A vehicle comprising a vehicle body having first and second opposite sides, a pair of first bogies having inner and outer ends on said first side, a pair of second bogies having inner and outer ends on said second side, a pair of first pivot means on said first side each mounting one of said first bogies intermediate the ends thereof, a pair of second pivot means on said second side each mounting one of said second bogies intermediate the ends thereof, first means interconnecting said inner ends of said first bogies, second means interconnecting said inner ends of said second bogies, a pair of first wheels mounted on said outer ends of said first bogies, a pair of second wheels mounted on said outer ends of said second bogies, a third wheel mounted on said inner end of one of said first bogies, and a fourth wheel mounted on said inner end of one of said second bogies, and said first and third wheels being located on said first bogies so that said third wheel can carry substantially twice the amount of the weight of said vehicle as each of said first wheels, and said second and fourth wheels being located on said second bogies so that said fourth wheel can carry substantially twice the amount of weight as each of said second wheels.

52. A vehicle as set forth in claim 51 including means for positively adjusting the angular positions of said first and second bogies and maintaining said first and second bogies in said adjusted position to thereby raise or lower at least one of said third or fourth wheels relative to said first and second wheels, respectively.

53. A vehicle as set forth in claim 52 including means for positively driving all of said first, second, third, and fourth wheels.

54. A vehicle comprising a vehicle body having first and second opposite sides, a pair of first bogies having inner and outer ends on said first side, a pair of second bogies having inner and outer ends on said second side, a pair of first pivot means on said first side each mounting one of said first bogies intermediate the ends thereof, a pair of second pivot means on said second side each mounting one of said second bogies intermediate the ends thereof, first means interconnecting said inner ends of said first bogies, second means interconnecting said inner ends of said first bogies, second means interconnecting said inner ends of said second bogies, a pair of first wheels mounted on said outer ends of said first bogies, a pair of second wheels mounted on said outer ends of said second bogies, a third wheel mounted on said inner end of one of said first bogies, and a fourth wheel mounted on said inner end of one of said second bogies, and means for positively adjusting the angular positions of said first and second bogies and maintaining said first and second bogies in said adjusted position.

55. A vehicle as set forth ion claim 54 wherein said last-mentioned means comprises motor means coupled to said first and second bogies.

56. A vehicle as set forth in claim 54 wherein said last-mentioned means comprise first means for adjusting the angular positions of said first bogies, and second means for adjusting the angular positions of said second bogies, said first and second means being operable independently of each other to thereby raise or lower each side of said vehicle relative to the other side thereof.

57. A vehicle as set forth in claim 55 including first and second brake and clutch means coupled to said first and second wheels, respectively, for turning said vehicle.

* * * * *

UNITED STATES PATENT AND TRADEMARK OFFICE
CERTIFICATE OF CORRECTION

PATENT NO. : 4,817,747
DATED : April 4, 1989
INVENTOR(S) : John F. Kopczynski

It is certified that error appears in the above-identified patent and that said Letters Patent is hereby corrected as shown below:

Column 3, line 61, after "wheels" insert --in--.
Column 8, line 26, after "the" insert --position 12", that is, it will move to the right a distance A.--.
Column 11, line 16, change "drive" to --drives--.
Column 12, line 55 (claim 1), after "of" insert --each of--;
    line 62 (claim 1), change "equal" to --the same--.
Column 13, line 2 (claim 2), change "he" to --the--.
Column 14, line 15 (claim 16), change "o" to --on--;
    line 18 (claim 16), change "bear" to --gear--.
Column 14, line 40 (claim 20), change "aisles" to --axles--.
Column 15, line 10 (claim 25), after "sides" insert --, first and second axles on each of said opposite sides--.
Column 15, line 68 (claim 28), before "to" insert --and for interconnecting the other outer end of the other of said third bogies--.
Column 16, line 3 (claim 29), change "28" to --44--.
Column 16, line 6 (claim 30), change "24" to --27--.
Column 16, line 15 (claim 31), change "thread" to --third--.
Column 18, lines 38 and 39 (claim 54), cancel "first bogies, second means interconnecting said inner ends of said".

Signed and Sealed this

Thirty-first Day of October, 1989

*Attest:*

DONALD J. QUIGG

*Attesting Officer*   *Commissioner of Patents and Trademarks*